US006958854B1

(12) United States Patent
Merriam

(10) Patent No.: US 6,958,854 B1
(45) Date of Patent: Oct. 25, 2005

(54) HIGH EFFICIENCY STOKES-SEEDING DUAL-CELL RAMAN SHIFTER

(75) Inventor: Andrew John Merriam, San Francisco, CA (US)

(73) Assignee: Actinix, Scotts Valley, CA (US)

( * ) Notice: Subject to any disclaimer, the term of this patent is extended or adjusted under 35 U.S.C. 154(b) by 292 days.

(21) Appl. No.: 10/371,860

(22) Filed: Feb. 21, 2003

Related U.S. Application Data

(60) Provisional application No. 60/359,103, filed on Feb. 25, 2002.

(51) Int. Cl.[7] .............................................. G02F 1/35
(52) U.S. Cl. ...................................................... 359/327
(58) Field of Search ................................. 359/326–332

(56) References Cited

U.S. PATENT DOCUMENTS

| | | | |
|---|---|---|---|
| 4,222,011 A | 9/1980 | Kurnit et al. | |
| 4,633,103 A | 12/1986 | Hyman et al. | |
| 5,062,112 A | 10/1991 | Buchman et al. | |
| 5,099,147 A | * | 3/1992 | Gregor et al. ............... 359/327 |
| 5,142,645 A | * | 8/1992 | Katz ........................... 359/327 |

* cited by examiner

Primary Examiner—John D. Lee

(57) ABSTRACT

A method and apparatus for high-efficiency stimulated Raman Stokes and anti-Stokes scattering is described. A dual-Raman scattering cell configuration is disclosed. A variable pressure of the first Raman cell causes a controllable pressure shift of the Raman-active two-photon transition. The frequency-shifted Stokes radiation generated in the first Raman cell, along with the residual pump laser radiation, is applied to a second Raman cell whose pressure is adjusted to maximize production of the anti-Stokes sidebands. By the steps of applying the first Stokes sideband "injection" signal, and controlling its frequency via the pressure difference of the two Raman cells, and its intensity by appropriate focussing, the process of Raman scattering may be significantly enhanced over the techniques of the prior art. These techniques are of especial interest to the production of intense, coherent, short-wavelength radiation, especially when only a single pump laser frequency is available.

13 Claims, 8 Drawing Sheets

HIGH EFFICIENCY STOKES-SEEDING DUAL-CELL RAMAN SHIFTER

CROSS-REFERENCE TO RELATED APPLICATION

This application claims benefit U.S. Provisional Patent Application Ser. No. 60/359,103, "High Efficiency Stokes-Seeding Dual hydrogen cell Raman Shifter," by Andrew J. Merriam, filed Feb. 25, 2002, which is incorporated herein by reference.

BACKGROUND OF THE INVENTION

Stimulated Raman scattering (SRS) is an important technique for shifting the optical outputs of available laser systems to shorter or longer wavelengths. In this way, coherent radiation is produced in regions of the optical spectrum which are not otherwise covered by combinations of available (fixed-wavelength) laser systems and crystalline nonlinear media, in particular, the mid- and far-infrared (IR) and the ultraviolet (UV) and vacuum-ultraviolet (VUV) regions of the electromagnetic spectrum. The spontaneous Raman scattering effect was discovered by Raman in 1923, who shone focussed filtered sunlight into different materials. Raman found, by analyzing the light emitted by the material, colors of light different than those he had applied to the medium. The color difference represented a difference in photon energies that Raman subsequently found to be characteristic of the particular material being irradiated. The difference in photon energies turned out to be equal to energies of transitions, either electronic, vibrational, or rotational, in the material. Quantum mechanically, the incident light mixes with the zero-point fluctuations (in a manner similar to the buildup of superfluorescence); the atom or molecule simultaneously absorbs an incident photon and emits a second photon at a (typically) longer wavelength (less energetic). The difference in photon energies causes a change in the internal energy of the atom or molecule, and the internal electronic distribution is changed.

The most common modern arrangement for the demonstration of SRS involves a pump laser, providing intense coherent radiation at a given wavelength, and a single vessel containing a Raman-active medium (which may be solid, liquid, or gaseous). A schematic diagram of such an arrangement is shown in FIG. 1. Typically, the output of a pulsed Q-switched laser is focussed to a high intensity (typically several GW/cm$^2$) into a pressurized cell 100 containing a Raman-active medium 105 (the Raman cell) by suitable lenses. Under these conditions, the Raman process evolves from a spontaneous single-photon process to a stimulated scattering (SRS) process involving many photons. An appreciable fraction of the pump laser energy 101 may be converted by SRS into a "comb" of sidebands 102, equally spaced by the Raman transition frequency, above and below the pump field frequency 121. Sidebands with frequencies less than the pump frequency 121 are known as the Stokes sidebands 122, and those with frequencies higher than the pump are the anti-Stokes sidebands 123. Raman shifting was the first nonlinear effect discovered after the invention of the laser in 1960, and as such, there is a great body of research on the subject. Common Raman gasses are molecular hydrogen ($H_2$) and deuterium ($D_2$). The number of these sidebands and their relative intensities depend upon the particular parameters of the apparatus. The most common variables in a gasseous Raman scattering experiment are the gas pressure 105 and the pump laser intensity, which may be varied by changing the focussing properties of the pump laser beam 101. Many examples of results using this type of apparatus exist in the prior art. Raman scattering is also used in the detection and identification of unknown media, as each material is characterized by a unique scattering "fingerprint".

The limitations of the simple arrangement shown in FIG. 1 (single pump laser beam 101 and single Raman cell 100) are well known, there are fundamental limitations on the fraction of incident pump energy that may be selectively scattered into a particular Stokes or anti-Stokes order. The generated sidebands 102 themselves are characterized by a relatively low degree of mutual coherence as compared to those generated using the techniques of the present Application.

This invention is particularly concerned with the simultaneous application of the pump laser frequency and the first Stokes sideband to a Raman medium—a process known as "Stokes injection" —to increase sideband generation efficiencies. It has recently been found that Stokes injection significantly enhances the SRS process. Previous experiments have noted dramatic improvements in shot-to-shot amplitude stability, spatial mode profiles, and conversion efficiencies. The increase of efficiency relative to the single-cell Raman shifters is most notable in the higher anti-Stokes orders.

More recently still, it also has been shown that the nonlinearity of the Raman medium available for the production of the plurality of sidebands 102 depends sensitively on the linewidths and exact frequency difference of the driving fields. Maximizing the Raman nonlinearity is desirable in order to maximize the extent and energy of the "comb" of generated sidebands. Whenever the Raman sidebands build up from quantum fluctuations, as is the case whenever a single pump laser and Raman cell are employed, the frequency separation between said sidebands is exactly equal to the frequency of the Raman transition. Equivalently, if a weak Stokes signal is injected into the Raman medium to enhance the scattering process, maximum gain is experienced when the Stokes signal frequency drives the Raman medium substantially on resonance. For this reason, to date, most experiments that have demonstrated Stokes injection have done so under conditions where the frequencies of the pump and first Stokes sidebands are adjusted so that their frequency difference is exactly equal to a two-photon vibrational transition resonance in the Raman medium.

Conversely, when Stokes signals of higher intensity (several GW/cm$^2$) are injected, the nonlinearity of the Raman medium maximizes when the driving lasers are detuned slightly from exact two-photon resonance. This curiosity arises because of the nature of Doppler broadening and the adiabatic excitation of a substantial fraction of the molecular population into a specific eigenstate. The driving of a Raman-active medium is shown schematically in FIG. 2 for off-resonance (non-zero $\delta v$) driving fields 210, 211. The two-photon frequency detuning $\delta v$ 220 is defined as $v_R - (v_P - v_B)$, where $v_R$ is the Raman transition frequency ($v_R = v_2 - v_1$) and $v_P$ and $v_B$ are the frequencies of the pump 210 and first-Stokes sideband 211, respectively. A wide comb of sidebands may be generated when the frequency detuning between the pump laser 210 and the electronic excited states 202 is large.

The numerical simulations shown in FIG. 3 illustrate the shift in optimum two-photon detuning $\delta v$ 220 away from exact resonance as a function of the applied pump 210 and Stokes-field 211 intensities $I_P$ and $I_B$ in $H_2$ gas at a pressure of 2.5 atmospheres at 298K. The Raman nonlinearity— specifically, the square of the Doppler-averaged Raman transition coherence at the pulse peak—is plotted against the two-photon frequency detuning of the driving lasers. Zero detuning 311 corresponds to exact two-photon resonance with the pertinent Raman transition. Parameters for these plots are as follows: applied lasers with 10-ns-pulsewidths, and intensities $I_P=I_B=$(a) 300 MW/cm$^2$, (b) 900 MW/cm$^2$, (c) 1500 MW/cm$^2$, and (d) 2750 MW/cm$^2$. It is clear from these data that the two-photon detunings that maximize the Raman nonlinearity depend upon the applied field intensities. In paricular, at low field intensities, the largest nonlinearities 310 occur exactly on-resonance 311, but when high-intensity fields are applied, maximum nonlinearities 321, 322 are instead obtained when the driving laser frequencies are tuned so that the two photon detuning is several hundred MHz, approximately one Doppler width, from the center of the Raman resonance 311. The frequency separation of the two peaks 321, 322 depends upon the laser field intensity, while the magnitude of the nonlinearity depends upon the Doppler width and decoherence mechanisms present in the Raman medium. Note that at high field intensities, the Raman nonlinearity reaches a minimum 320 near Raman resonance 311. Experimental verification of these trends may be found in A. V. Sokolov et al., "Raman Generation by Phased and Antiphased Molecular States", Phys. Rev. Lett. 85, 562 (2000). The experimental apparatus of Sokolov employed two separate, powerful, costly single-mode pulsed laser systems, the precise frequency difference of which could be easily adjusted.

The numerical simulations of FIG. 3 are known as 'time-only' simulations: they simulate the macroscopic temporal behavior of a distribution of irradiated molecules at a given point in space. In reality, the Raman interaction occurs in a region of space defined by the interacting beams, i.e., across a certain length of the Raman medium; thus, the sideband 'comb' is generated, and continues to interact, over a distribution of space. Estimation of the generation efficiency of any particular sideband in the 'comb' should therefore consider the propagation of the electromagnetic fields over this region. Simulations incorporating space as well as time have corroborated the experimental observations of increased sideband generation efficiency using off-resonance drive fields. Further, these simulations have confirmed that said generation efficiency increase is partially due to the increased adiabaticity of the off-resonant molecule-field interaction. One measure of the adiabaticity of the Raman-type interaction considered in this Application is the fraction of energy which remains in the medium after the fields have traversed said medium. Energy in a Raman interaction flows from the applied electromagnetic fields to both the comb of generated sidebands and the material itself. The more adiabatic the interaction, the larger the fraction of energy which may propagate through said medium and which is therefore available for sideband generation. For a given amount of material excitation, increased adiabaticity results in increased sideband generation.

It is worth noting that high-intensity fields tuned to exact Raman resonance 311 excite only a small fraction of the available Raman nonlinearity 320 (low material excitation), as shown in FIG. 3. This type of interaction represents the usual manner by which previous 'enhanced' Raman shifters were operated. Similarly reduced material excitation 330 is observed when large two-photon frequency detunings are employed. Additionally, the interaction of the molecules with said intense, resonant fields is strongly non-adiabatic, causing a significant reduction in the amount of energy available for sideband generation. These conditions, which are characteristic of Raman-shifters of the prior-art, have significantly reduced the sideband generation efficiencies of said prior-art shifters.

PRIOR ART RELEVANT TO THE INVENTION

There are several patents which have taught the use of two (or more) Raman cells. U.S. Pat. No. 5,062,112, Buchman et al. "Two-cell Raman converter" (1991) employs two cascaded Raman cells optimized to achieve maximum conversion into Stokes lines. Their object in optimizing the pressure of each cell was to maximize the rotational component and to minimize the vibrational scatter component. U.S. Pat. No. 4,663,103, Hyman et al., "Two-cell stimulated Raman scattering frequency conversion laser" (1986) employs two Raman cells, again to sequentially Stokes-shift the radiation of an applied laser.

Each of the above inventions taught the use of dual Raman scattering cells for the purpose of obtaining higher-order Stokes-shifted coherent radiation. This is possible because of the automatic phase-matching condition of Stokes radiation production. The production of anti-Stokes radiation, however, is considerably more difficult due to phase matching requirements. In the previous two inventions, the Raman medium pressure could be freely adjusted without consideration for phase matching, and in fact, both inventions attempted to suppress the anti-Stokes generation process.

There exists prior art which has mentioned the concept of Stokes injection. U.S. Pat. No. 4,222,011, Kurnit (1980) "Stokes injected Raman capillary waveguide amplifier" teaches how to amplify the first-order Stokes radiation by insertion of a weak Stokes field, i.e. the Raman scattering process is used as an amplifier for this one sideband. In this instance, the Stokes injection reduces the pump laser intensity required for gain at the first Stokes line. The invention does not teach how the process of injection affects the generation of the other sidebands.

As noted earlier, previous experiments have noted dramatic improvements in shot-to-shot amplitude stability, spatial mode profiles, and conversion efficiencies when the Raman process is seeded with a Stokes injection signal, although it is not always referred to as "Stokes injection". Two early references are: V. Schulz-von der Gathen, T. Bornemann, V. Kornas, and H. F. Dobele, "VUV generation by High-Order CARS", and L. L. Losev, A. P. Lutsenko, and S. N. Sazonov, "efficient parametric generation of higher stimulated Raman scattering components with diffraction-limited divergence", Sov. J. Quantum Electron. 20 (8), p 878–879 (1990). In the setup of Gathen et al. the Stokes injection signal was produced by a second coherent laser (a dye laser with a wide spectral bandwidth), whereas losev et al. observed stimulated rotational scattering in a dual-Raman cell similar to that considered in the present invention. The latter paper by Losev et al., considering the results of past researchers, clearly indicates the utility of applying a Stokes "injection" signal: higher energies at higher sideband orders are produced, and the spatial profiles of these sidebands are dramatically improved, even without the pressure shift. The data presented in the former paper by Gathen et al. show the gains in amplitude stability which is afforded by Stokes injection. Neither paper, however, teaches the influence of the pressure shift in the Stokes injection process.

Two other recent papers specifically discuss the injection of a Stokes signal to improve vibrational Raman scattering in Hydrogen: these are S. Wada, H. Moriwaki, A. Nakamura, and H. Tashiro, "Injection seeding for the enhancement of high-order anti-Stokes stimulated Raman scattering", Opt. Lett. 20 (8) p. 848–850 (1995), and A. Goehlich, U. Czarnetzki, and H. F. Dobele, "Increased efficiency of vacuum ultraviolet generation by stimulated anti-Stokes Raman scattering with Stokes seeding", Appl. Opt. 37 (36), p. 8453–8459 (1998). These papers share common superficial aspects with the present invention. In both experiments, a dual-Raman cell configuration was employed: a first Raman cell to generate a Stokes beam, and a second Raman cell to generate the higher-order sidebands. Both papers report improvements to both the energy and spatial mode quality of the generated sidebands. Both papers, however, utilize Stokes cells which are operated at very high pressure (15 atmospheres in Wada's case, and 1 MPa—approximately 10 atmospheres—in Goehlich's case). This was done primarily to obtain high-pulse-energy Stokes beams, but the authors were unaware or unable to take advantage of the effects introduced through use of such large pressures. From the simulations presented in this Application, it can be seen that the large pressure shifts and pressure broadening associated with high pressures or large-linewidth lasers are clearly deleterious, and narrow-linewidth pump lasers are desirable.

SUMMARY OF THE INVENTION

This invention combines the steps of Stokes injection, frequency detuning, and variable pump laser intensity to create maximal Raman nonlinearity, and the means to achieve this frequency detuning using the pressure shift of the two Raman media from a single pump laser frequency. The large Raman nonlinearity and off-resonance, adiabatic driving makes possible the efficient generation of a wide "comb" of sidebands, each of which are highly phase-coherent with the others. The invention enables Raman generation efficiencies which are significantly greater than those of prior-art single-Raman cells, without the complication or expense of a two-tunable-laser system. A first Raman cell at a first pressure is employed to generate a Stokes sideband with a controllable frequency. This radiation is combined with additional pump laser light and re-introduced to a second Raman cell maintained at a second pressure. Because of the pressure difference between the cells, a single pump laser frequency may be employed to drive a Raman medium in the second cell with a variable detuning $\delta v$. The magnitude of the detuning and intensities of the interacting laser fields are chosen to maximize the Raman nonlinearity and thus the amount of Raman sideband light generated in the second Raman cell. The particular operating pressures of specific embodiments depend upon the nature and extent of the pressure shift and broadening associated with the particular choice of Raman medium. Large ratios of pressure shift to pressure broadening are desirable; for example, optimum results in Hydrogen are obtained at liquid nitrogen temperatures (80 K).

OBJECTS OF THE INVENTION

It is a primary object of this invention to teach the methods by which the practice of stimulated rotational and vibrational Raman scattering may be enhanced through the use of dual Raman scattering cells and the pressure shift.

It is a secondary object to teach how two intense laser fields with a variable frequency difference, appropriate for enhanced Raman scattering, may be generated using a single pump laser.

It is another object of the present invention to apply these concepts to the generation of 157.62 nm radiation using stimulated vibrational Raman scattering in molecular hydrogen ($H_2$) gas and a frequency-quintupled Nd:YAG pump laser system.

It is yet another object to provide an optically-simple source of a large number of simultaneous, mutually phase-oherent frequency sidebands covering a wide spectral bandwidth.

It is a final object to provide a VUV source with a high-quality spatial mode suitable for use in optical imaging instruments.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

Figure 4:
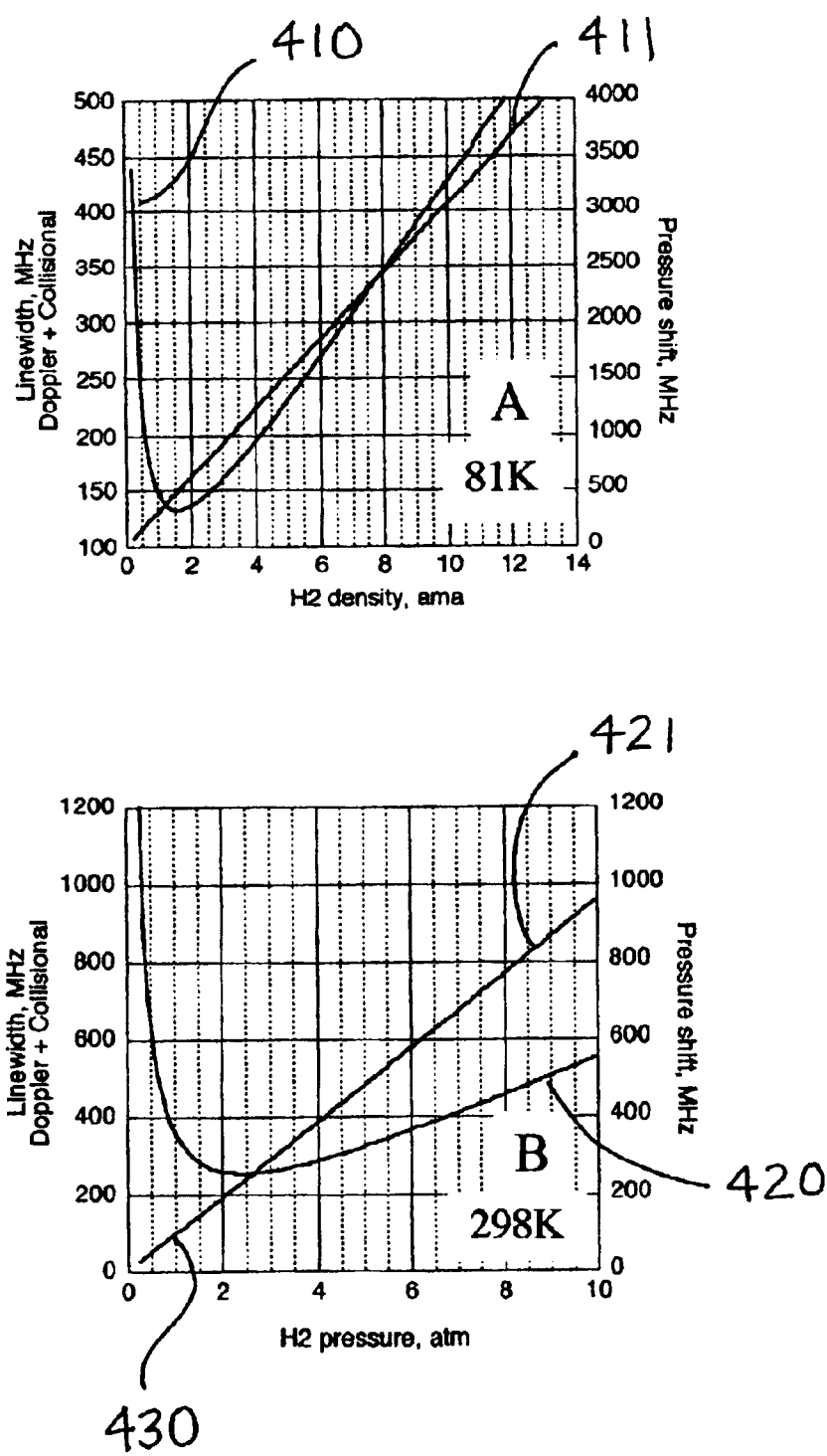
FIG. 4 Pressure-induced frequency shifts and linewidths of molecular hydrogen ($H_2$) gas at 298K and 81K.

From the description in the preceeding sections, it is apparent that greatly enhanced sideband 'comb' generation can be obtained from a given Raman-active medium if in addition to the pump laser field, a second coherent field is applied to said medium. The frequency difference between the pump and said second field should be approximately equal to the two-photon Raman transition frequency of interest; the optimum central frequency detuning is a function of both the irradiating fields' temporal pulseshapes, intensities, and the width of said transition. It is often the case that two such high-quality, independently tunable laser systems are unavailable at the desired frequencies needed to efficiently drive a particular Raman-active medium. To take advantage of the aforementioned intensity-dependent frequency response of the nonlinear medium, some means must be found to provide a second laser field of a given intensity with a controllable frequency separation from the first laser field; said frequency difference should be nearly equal to the Raman transition frequency separation of the chosen medium. This transition frequency may be that which is consistent with either rotational or vibrational scattering within the medium. Combining traditional SRS with the phenomenon of the pressure shift fulfills this requirement It has long been known that the spectra of isolated atoms and molecules are modified when other atoms or molecules are introduced. The interaction between atoms and molecules causes the frequency of transitions to be shifted and the corresponding linewidth broadened. The magnitude of the pressure shift and pressure broadening is unique to every pair of interacting atoms or molecules and to each transition therein; FIG. 4 provides the shift 411, 421 and transition linewidth 410, 420 data for the $Q_{01}(1)$ branch of molecular Hydrogen, which is responsible for the familiar 4155.2 cm$^{-1}$ Raman shift (1 cm$^{-1}$=30 GHz). In general, the frequency of the Raman transition as a function of pressure P can be written as $v_R(P)=v_R(0)+\alpha P$, where a is a constant of the material. The data of FIG. 4 are taken from W. Bischel and M. Dyer, "Temperature dependence of the Raman linewidth and line shift for the Q(1) and Q(0) transitions in normal and para-$H_2$", Phys. Rev. A, 33 (5), pg. 3113–3123 (1986).

From the data of FIG. 4, it is seen that the frequency of the $Q_{01}(1)$ branch transition is reduced (shifted down in energy) by 96 MHz at a Hydrogen pressure of 1 atmosphere at 298K, point 430. A single-cell Raman shifter experiment generates sidebands commensurate with this frequency shift. This means that if a pump laser were introduced to a Hydrogen cell at 1 atmosphere pressure, the first Stokes sideband would build up from noise and be generated exactly on the (shifted) Raman resonance, with a frequency of 4155.2 cm$^{-1}$ plus 96 MHz. The linewidth of the generated Stokes beam is the larger of the pump laser linewidth or the Raman transition linewidth, a fact which will be considered below. Varying the pressure of a first Raman cell would thus seem to be an ideal method for generating a continuously-variable frequency shift relative to a second Raman cell at a second pressure.

Figure 5:
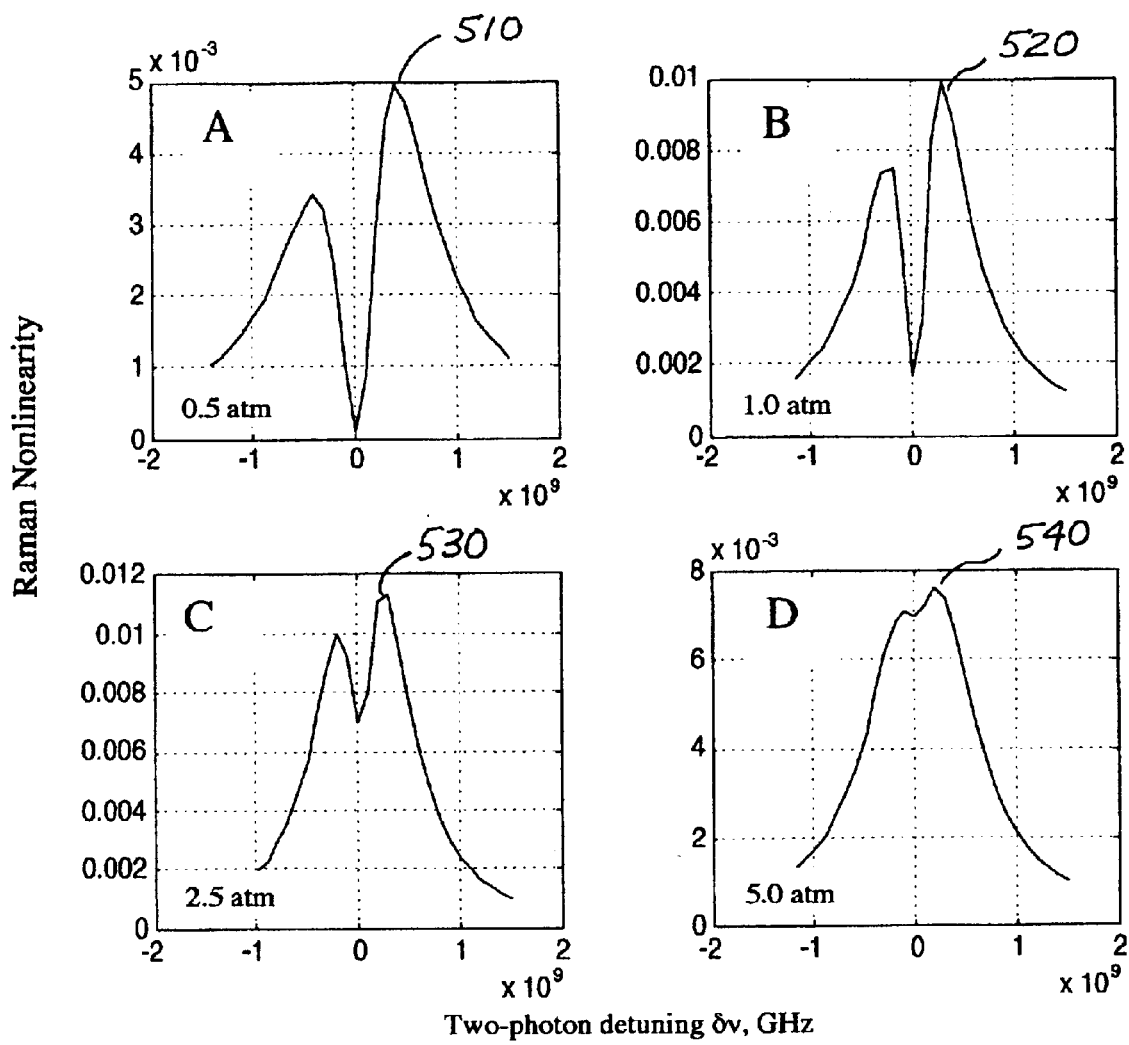
FIG. 5 Computed Raman nonlinearity as a function of Raman cell pressure and two-photon detuning for fixed-intensity applied laser fields.

A possible limitation to this technique is the pressure broadening that occurs concurrently with the pressure shift of a medium. Physically, the pressure broadening causes the phase coherence of an ensemble of atoms or molecules, each of which is initially set into phase-synchronous motion, to decay through collisions with neighboring atoms and molecules. Since the Raman nonlinearity is due to a phase-coherence effect, increased coherence decay rates due to increased Raman medium pressures reduce the maximum achievable nonlinearities. This is shown in the hydrogen simulations of FIG. 5, in which the Raman nonlinearity is computed for fixed-intensity pump 210 and first-Stokes 211 laser fields, as the pressure 105 of the hydrogen cell 100 is varied from 0.5 atmospheres to 5.0 atmospheres. In this figure, although the magnitude of the Raman nonlinearity 510, 520, 530, 540 initially increases due to the motional narrowing of Hydrogen at these pressures, the increasing pressure broadening ultimately reduces the maximum nonlinearity, as shown in FIG. 5(D). Pressure broadening thus potentially limits the range over which the pressure-shifting technique may be used to advantage, to an amount which depends on the choice of Raman medium.

The total coherence decay rate of the Raman transition coherence in the second Raman cell, denoted by $\gamma_R$, is the sum of two quantities: the pressure broadening of the second Raman cell itself, and the linewidth of the applied pump and Stokes beam lasers. Although the bandwidth of the pump may be quite narrow—for example from a single mode laser system—the linewidth of the Stokes field is set by the linewidth of the Raman transition 410, 420 in the first Raman cell, which is in turn set by the pressure and temperature of the first cell, as shown in FIG. 4. The pressures of both Raman cells should thus be kept as low as possible, subject to the condition that the pressure difference between the cells imparts sufficient $\delta v$ 220 to maximize the Raman nonlinearity. A value of $\delta v$ 220 on the order of the Doppler width of the Raman transition also increases the adiabaticity of the interaction and thus further improves the generation of the wide "comb" of sidebands in the second Raman cell.

DESCRIPTION OF THE PREFERRED PREFERRED EMBODIMENT

Figure 6:
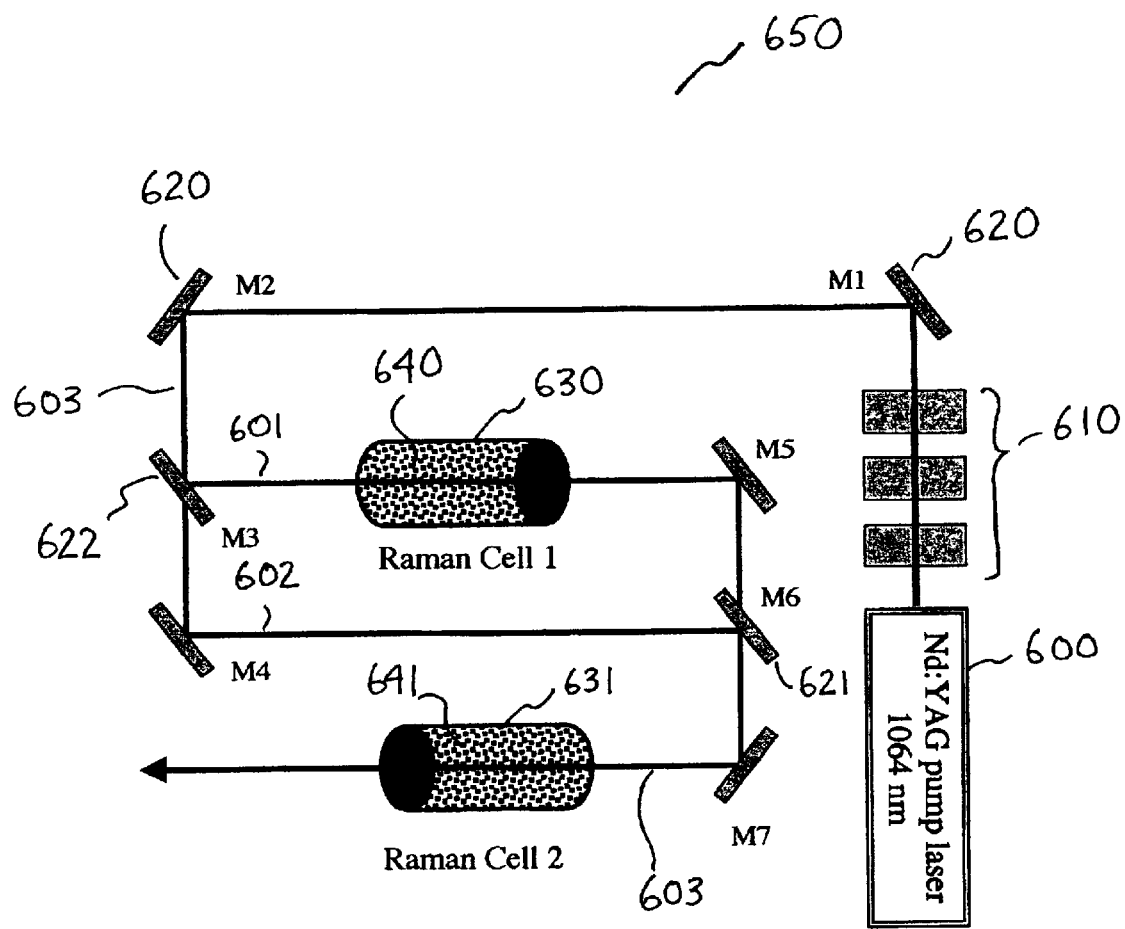
FIG. 6 Schematic diagram of the dual-Raman cell, Stokes-seeding preferred embodiment FIG. 7 Computed second-cell Raman nonlinearity as a function of first Raman cell pressure at 81K for a second Raman cell density of 1 amagat.

The preferred embodiment of the high-efficiency Raman shifter is shown schematically in FIG. 6, and concerns the generation of 157.26 nm radiation. The coherent output of a Nd:YAG laser system 600 is frequency quintupled by non-linear elements 610, guided by reflective mirrors 620 to two molecular hydrogen Raman cells 630, 631 maintained at certain pressures 640, 641. A portion of the total pump light 603 may be diverted by partial reflector 622 towards the first Raman cell 630. Note that the combined energies of multiple nearly-identical pump lasers may be employed to drive each cell 630, 631 individually. The first Raman cell 630, at a first pressure 640, is optimized (e.g., by changing the physical cell length or the pump laser intensity) for the production of the first Stokes sideband (denoted S1). These techniques are known in the art. The wavelength of the S1 component generated by a pump wavelength of 212.9 nm is 233.6 nm. The first cell 630 typically has a relatively high pressure 640 (several atmospheres or more) of molecular hydrogen gas and a majority of the incident pump beam 601 will be converted to the first two Stokes sidebands S1 and S2. The high pressure 640 of the cell 630 induces a pressure shift in the absolute frequency of the S1 field and provides a two-photon detuning when pump 602 and S1 fields are applied to a second Raman cell 631 maintained at a second pressure 641. The S1 component from the first Raman shifter 630 is overlapped spatially and temporally with the residual 212.9 nm pump laser radiation 602 by beam combiner 621, and the pair of beams 603 focussed into the second Raman cell 631. To take advantage of the pressure shift of the first cell 630, the pressure 641 in the second hydrogen cell 631 is quite low and the interaction lengths long. Preferably, the temperature of the Hydrogen cells 630, 631 are reduced to approximately 80K by liquid nitrogen cooling. This promotes the concentration of molecular population into a single (lowest-energy) molecular state, as well as increasing the pressure shift-to-broadening ratio.

Figure 1:
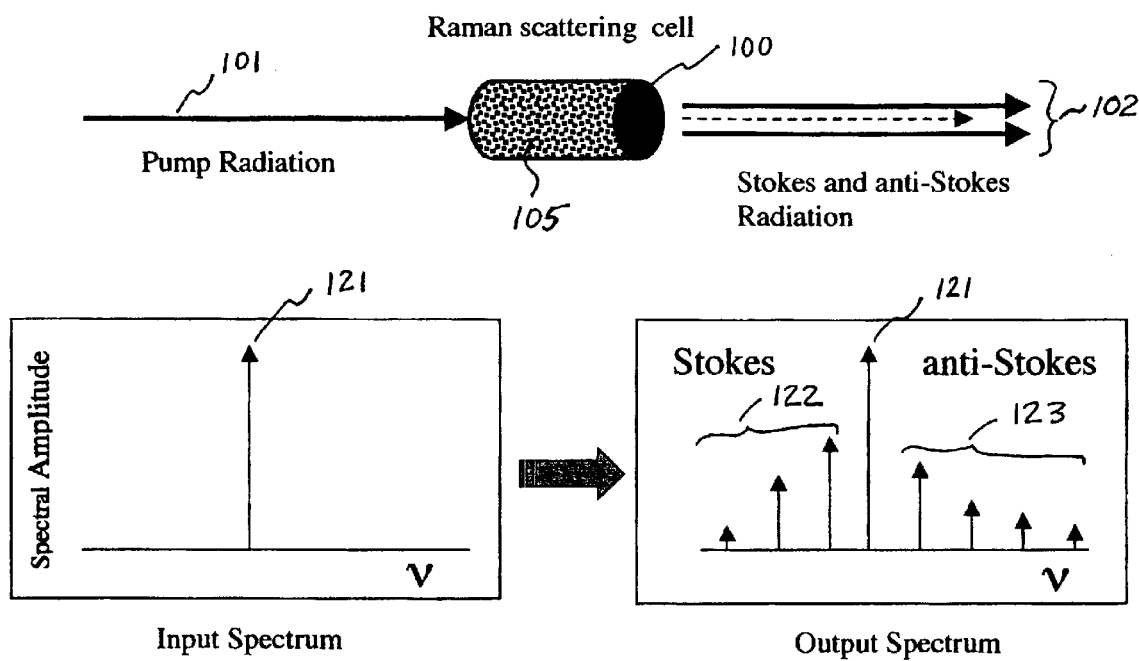
FIG. 1 Schematic diagram of a typical single-cell Raman scattering experiment and the plurality of frequencies produced (known as the sideband "comb").
Figure 2:
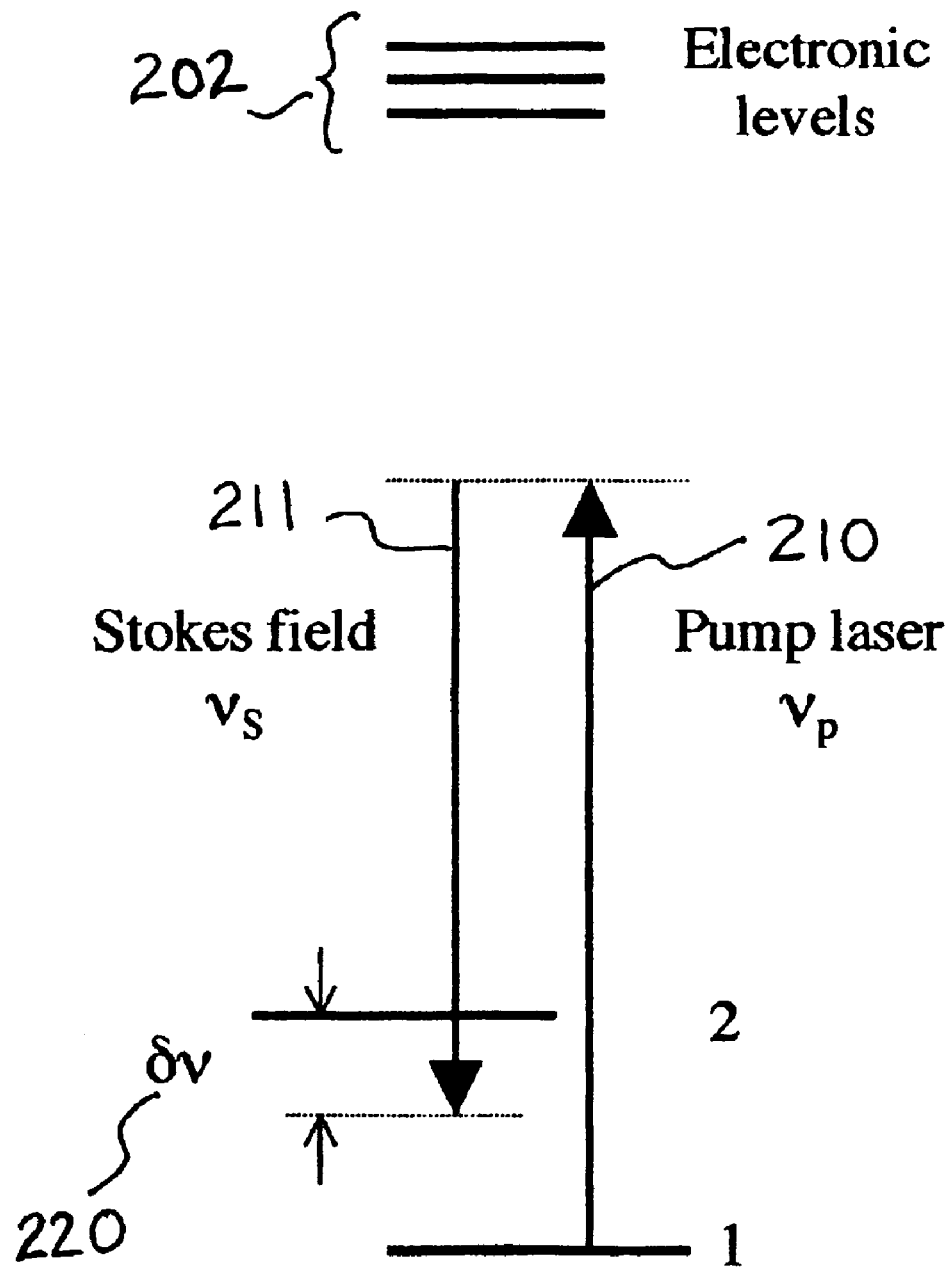
FIG. 2 Energy-level diagram of typical Raman medium illustrating two-photon detuning from a Raman transition by two electromagnetic fields.
Figure 3:
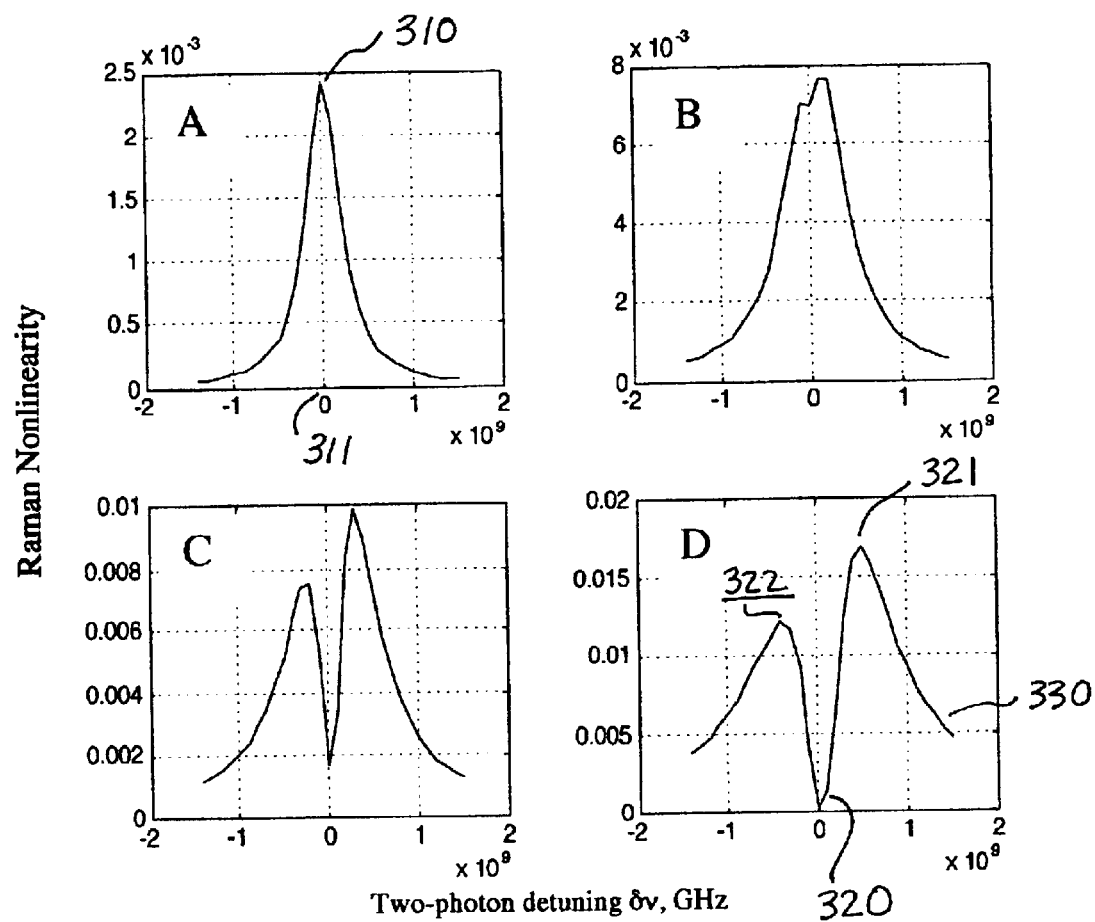
FIG. 3 Computed Raman nonlinearity as a function of intensity and two-photon detuning of applied laser fields.
Figure 7:
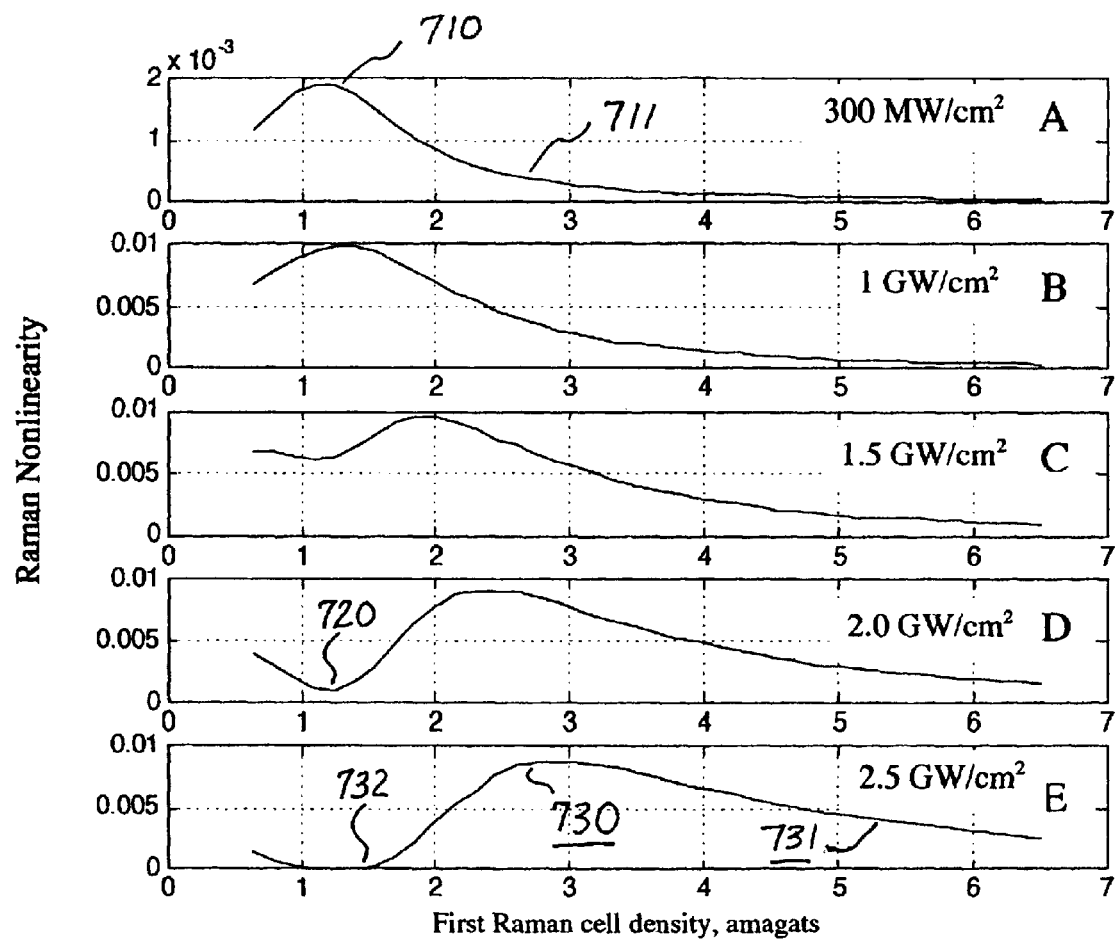
Figure 8:
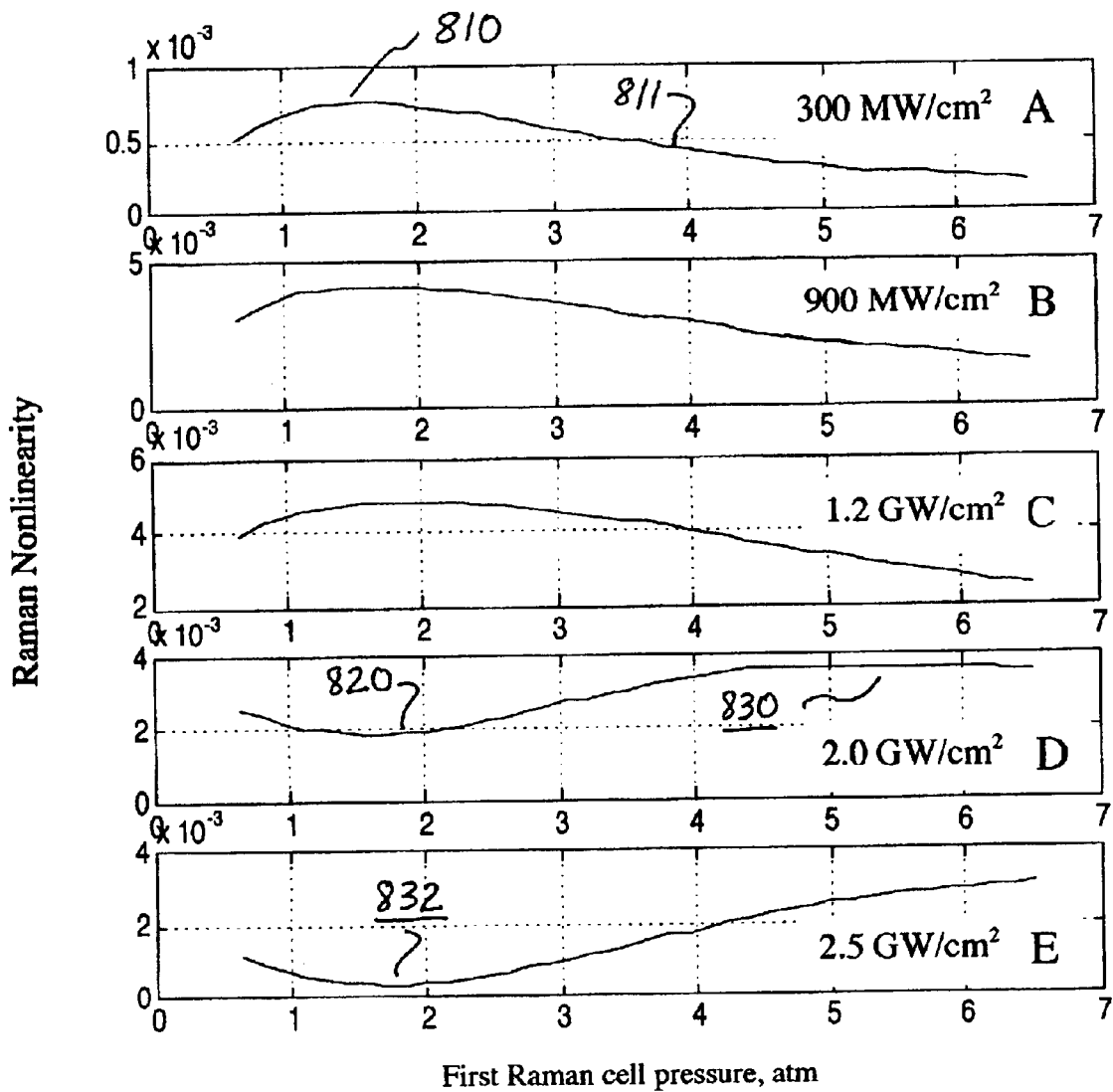
FIG. 8 Computed second-cell Raman nonlinearity as a function of first Raman cell pressure at 298K for a second Raman cell density of 1 amagat.

Pressure broadening in the first Raman cell 630 spectrally broadens the S1 sideband field which is generated therein. This fact causes an optimum operating condition which may be achieved in the dual Raman shifter 650. For low intensities, increasing the applied laser intensity increases the magnitude of the Raman nonlinearity and the splitting between the peaks, as shown in FIG. 3. A correspondingly larger pressure is then required in the first Raman cell 630 to ensure that the second Raman cell 631 is driven with the correct $\delta v$ 220. However, above a pressure of several atmospheres, the pressure broadening becomes prohibitively high and further increases in either pressure shift or laser intensity actually may decrease the maximum attainable Raman nonlinearity. These tradeoffs are illustrated in the simulations of FIGS. 7 and 8, which compute the Raman nonlinearity in the second Raman cell 631 as functions of the pressure 640 of the first Raman cell 630 and the intensities of the applied laser fields 603, 210, 211. Specifically, the Raman nonlinearity is the square of the Doppler-averaged molecular vibration coherence at the peak of the applied laser pulses. For these simulations, the linewidth of the Stokes field is incorporated via the total $\gamma_R$ value of the second Raman cell 631. The simulation of Hydrogen gas is further complicated by the motional narrowing that occurs for pressures under 10 atmospheres. FIG. 7 is for a temperature of 81K, while FIG. 8 is for 298K. In both cases, the maximum Raman nonlinearity 710, 730, 810, 830 first increases with both increasing pressure and applied laser intensity. At the highest applied laser intensities, that require large pressures shifts, the pressure broadening begins to decrease the maximum attainable Raman nonlinearity 711, 731, 811, 831. This deleterious effect is most noticeable at higher temperatures due to the reduced shift-to-broadening ratio. In either case, a region of optimum laser intensity and Raman cell pressures may be identified. The benefit to sideband 'comb' generation is two-fold: increased Raman nonlinearity, and increased adiabaticity at pressure shifts roughly equal to one transition Doppler width. Optimum gas pressures are typically less than 5 atmospheres and laser intensities between 1 and 2 $GW/cm^2$, and pressure differences between 1 and 3 atmospheres. The high-intensity, on-resonance cancellation of Raman nonlinearity 320 is manifested in FIGS. 7 and 8 by the minima 720, 820, 732, 832 that occur at operating pressures of first cell 630 near 1 atmosphere (i.e., for small pressure shifts). Points 711, 731 indicate the reduction of Raman nonlinearity that occurs when higher-than-optimum pressure 640 of the first Raman cell 630 is employed; such high-pressure conditions are typical of prior art embodiments.

Although the invention has been described in considerable detail with reference to certain preferred embodiments thereof, other embodiments are possible. The Raman cells discussed in this Application are any object which contains or borders a particular type of medium, be it solid, liquid or gas: other 'cells' include liquid tubes, hollow glass capillary fibers, and stainless-steel pressure vessels. For example, to assist in phase matching of the nonlinear comb generation process, the second Raman-active medium could be in a guidedwave geometry, e.g., contained within a hollow fiber. Therefore, the scope of the appended claims should not be limited to the description of the preferred embodiments contained herein.

What is claimed is:

1. A nonlinear optical mixer for converting energy from one wavelength to a plurality of other wavelengths, the nonlinear optical mixer comprising:
   a first cell containing a first pressure of a first Raman-active nonlinear material;
   a second cell containing a second pressure of a second Raman-active nonlinear material;
   a pump laser source for generating a pump laser beam, a portion of which is directed towards said first cell, wherein a first Stokes sideband is generated;
   a beamsplitter for combining and directing a second portion of said pump laser beam and said first Stokes sideband into said second cell; and
   wherein the frequency difference between the pump laser and the first Stokes sideband is adjusted, by suitable adjustment of the relative pressures of said first and second cells, to drive a selected Raman transition of said second cell with a controllable detuning, thereby maximizing both the Raman transition nonlinearity and the adiabaticity of the Raman two-photon interaction for a given choice of interacting electromagnetic field intensities.

2. The nonlinear optical mixer of claim 1 wherein said Raman-active nonlinear materials in said first and second cells are substantial identical.

3. The nonlinear optical mixer of claim 2 wherein the choice of Raman-active nonlinear material is molecular Hydrogen ($H_2$) gas.

4. The nonlinear optical mixer of claim 2 wherein the choice of Raman-active nonlinear material is molecular Deuterium (D2) gas.

5. The nonlinear optical mixer of claim 1 wherein the second Raman-active nonlinear material is contained in a hollow capillary-style fiber, or a hollow photonic crystal-style fiber.

6. The nonlinear optical mixer of claim 3 wherein the pump laser source has a wavelength of approximately 212.9 nm and is provided by the fifth harmonic of a Nd:YAG laser apparatus.

7. The nonlinear optical mixer of claim 2 wherein the density of the first Raman-active medium is less than five (5) amagats.

8. The nonlinear optical mixer of claim 2 wherein the density of the second Raman-active medium is less than one (1) amagat.

9. A nonlinear optical mixer for converting energy from one wavelength to a plurality of other wavelengths, the nonlinear optical mixer comprising:
   a first cell containing a first pressure of a first Raman-active nonlinear material;
   a second cell containing a second pressure of a second Raman-active nonlinear material;
   a first pump laser source for generating a first pump laser beam directed towards said first cell, wherein a first Stokes sideband is generated;
   a second pump laser source for generating a second pump laser beam directed towards said second cell;
   a beamsplitter for combining and directing said pump laser light and said first Stokes sideband light into said second cell; and
   wherein the frequency difference between the second pump laser and said first Stokes sideband is adjusted, by suitable adjustment of the relative pressures of said first and second cells, to drive a selected Raman transition of said second cell with a controllable detuning, thereby maximizing both the Raman transition nonlinearity and the adiabaticity of the Raman two-photon interaction for a given choice of interacting electromagnetic field intensities.

10. The nonlinear optical mixer of claim 9 wherein said Raman-active nonlinear materials in said first and second cells are substantially identical.

11. The nonlinear optical mixer of claim 10 wherein said first and second pump laser sources are substantially identical.

12. The nonlinear optical mixer of claim 10 wherein the choice of Raman-active nonlinear material is molecular Hydrogen ($H_2$) gas.

13. The nonlinear optical mixer of claim 10 wherein the choice of Raman-active nonlinear material is molecular Deuterium ($D_2$) gas.

* * * * *